Jan. 27, 1931.  F. LUTZ  1,790,386
FEEDING MECHANISM FOR SEWING MACHINES
Filed Jan. 8, 1927
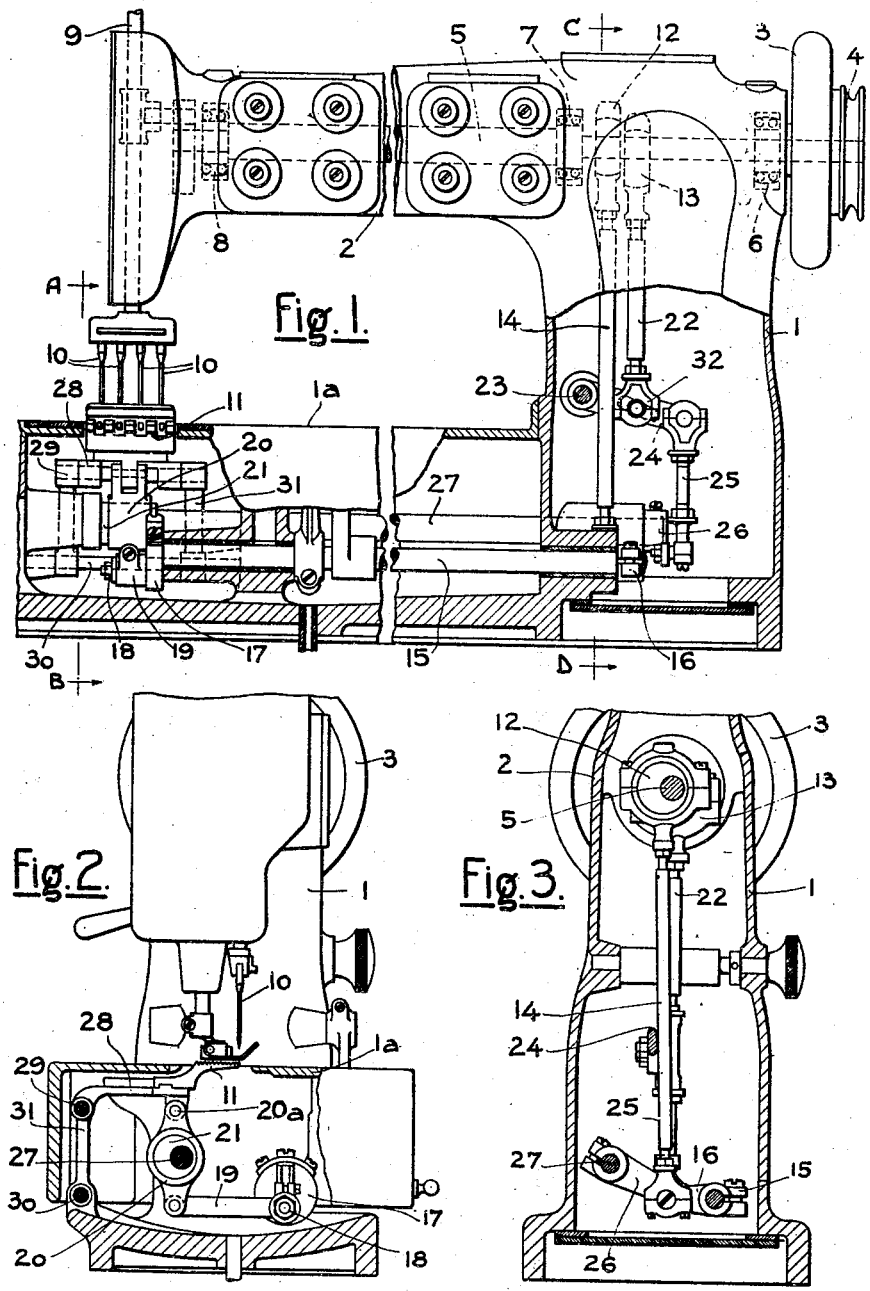

Patented Jan. 27, 1931

1,790,386

UNITED STATES PATENT OFFICE

FRIEDRICH LUTZ, OF STUTTGART, GERMANY, ASSIGNOR TO UNION SPECIAL MASCHINENFABRIK, G. M. B. H., OF STUTTGART, GERMANY

FEEDING MECHANISM FOR SEWING MACHINES

Application filed January 8, 1927, Serial No. 159,960, and in Germany February 23, 1926.

The invention relates to new and useful improvements in feeding mechanisms for sewing machines, and more particularly to a four-motion feeding mechanism.

An object of the invention is to provide a feeding mechanism of the above type, wherein the feed bar carrying the feed dog is given a back and forth and an up and down movement by a single connection with the feed bar through actuating devices which are timed so as to impart a four-motion movement to the feed dog.

A further object of the invention is to provide a feeding mechanism of the above type, wherein the length of the back and forth movements may be varied and also the up and down movements of the feed dog may be varied.

A still further object of the invention is to provide a feeding mechanism of the above type, wherein the feed dog is moved back and forth by a lever fulcrumed intermediate its length, and wherein said fulcrum is raised and lowered for raising and lowering the feed dog.

These and other objects will in part be obvious and will in part be hereinafter more fully disclosed.

In the drawings which show by way of illustration one embodiment of the invention—

Figure 1 is a view partly in front elevation and partly in section showing a sewing machine embodying the improvements;

Fig. 2 is a sectional view on the line A—B of Fig. 1; and

Fig. 3 is a sectional view on the line C—D of Fig. 1.

In carrying out the invention, a feed dog is provided which is mounted beneath the work support. The feed dog is carried by a feed bar attached to a feed rocker, but all of the movements imparted to the feed dog are derived from a connection with the feed bar substantially directly beneath the feed dog. This actuating mechanism consists of a lever pivoted to the feed bar at the free end thereof, and fulcrumed intermediate its ends. The lower end of the lever is connected through a suitable link with a rotating crank which rocks the lever and thus moves the feed dog back and forth. The fulcrum in the present invention is in the form of an eccentric, and this eccentric is mounted on a shaft connected to the main shaft of the machine, so that said shaft is oscillated, and thus the eccentric is oscillated for bodily raising and lowering the lever and thus raising and lowering the feed dog. The extent of oscillation of the eccentric may be varied for varying the up and down movement of the feed dog, and the extent of oscillation of the lever may be varied for varying the back and forth movement of the feed dog.

Referring more in detail to the drawings, the invention is shown as embodied in a sewing machine including a standard 1 carrying an overhanging arm 2, having bearings 6, 7 and 8 in which is mounted the main shaft 5. The main shaft 5 is provided with a hand wheel 3 and a belt wheel 4. The needle bar 9 is provided with a plurality of needles 10, and this needle bar is reciprocated by suitable connections with the main shaft 5.

The feed dog 11 is carried by a feed bar 28 located beneath the work support 1ª. This feed bar 28 is pivoted at 29 to a feed rocker 31, which in turn is pivoted at 30 to the bed of the machine. A lever 20, which is substantially vertical, is pivoted at 20ª to the feed bar, and at the free end of the feed bar and substantially below the feed dog carried by the feed bar. This lever 20 is fulcrumed on an eccentric 21 carried by a shaft 27. This eccentric 21 is oscillated by mechanism which will be later described. The lever is oscillated on its fulcrum support by means of a link 19 connected to a crank 18 radially adjustable on a disk 17 which is mounted on a shaft 15.

The shaft 15 at the end thereof in the standard 1, is provided with an arm 16. The arm 16 carries a ball stud to which an eccentric strap 14 is connected. This eccentric strap 14 cooperates with an eccentric 12 on the main shaft 5. Thus it is that through the rotations of the main shaft 5, the shaft 15 is oscillated, and through the link 19, the lever 20 is oscillated. The oscillations of the lever 20 will move the feed bar back and forth, and thus impart the back and forth movements to the feed dog. It is understood, of course, that the feed rocker 31 will rock to permit these movements of the feed bar.

The shaft 27 in the standard 1 is provided with an arm 26. A link 25 is pivoted to a ball stud carried by the arm 26. This link 25 is connected at its upper end to a ball stud carried by a rocker arm 24. The rocker arm 24 is carried by a shaft 23 journaled in the standard 1. An eccentric strap 22 is connected to a ball stud 32 mounted on the rocker arm 24. The eccentric strap 22 cooperates with an eccentric 13 on the main shaft 5. As the main shaft 5 rotates, the eccentric 13 through the train of mechanism just described, will impart an oscillation to the shaft 27, and this in turn will impart an oscillation to the fulcrum eccentric 21 on which the lever 20 is mounted. The extent of oscillation imparted to the eccentric 21 may be varied by shifting the ball stud 32 in a slot in the rocker arm 24.

The eccentrics are so timed that the lever 20 will impart a four-motion to the feed dog 11. That is, the feed dog is raised into contact with the material and is then moved to impart a feeding movement to the material, and is then lowered out of engagement with the material, and is returned for its next feeding stroke. The path of the feed dog is more or less of an elliptical path. All of the movements of the feed dog, however, are imparted thereto by this single lever, which is not only oscillated, but which is bodily raised and lowered.

It is obvious that minor changes in the details of construction may be made without departing from the spirit of the invention as set forth in the appended claims.

Having thus described the invention, what I claim as new and desire to secure by Letters Patent, is—

1. A feeding mechanism for sewing machines comprising a feed dog, a feed bar supporting said feed dog, a rocker pivotally supporting the feed bar, said feed dog being located at the free end of said feed bar, and means connected to said feed bar at the free end thereof for moving said feed dog back and forth and up and down.

2. A feeding mechansim for sewing machines comprising a feed dog, a feed bar supporting said feed dog, a rocker pivotally supporting the feed bar, said feed dog being located at the free end of said feed bar, means connected to said feed bar at the free end thereof for moving said feed dog back and forth and up and down, said last-named means including a lever pivoted to the feed bar and fulcrumed intermediate its ends, actuating means for oscillating the lever, and actuating means for raising and lowering the fulcrum of said lever.

3. A feeding mechanism for sewing machines comprising a feed dog, a feed bar supporting the feed dog, a rocker to which said feed bar is pivoted, a substantially vertical lever pivoted to the feed bar, an eccentric on which said lever is fulcrumed, means for oscillating the lever on said eccentric for moving the feed bar back and forth, and means for oscillating the eccentric for raising and lowering the feed dog.

4. A feeding mechanism for sewing machines comprising a feed dog, a feed bar supporting the feed dog, a rocker to which said feed bar is pivoted, a substantially vertical lever pivoted to the feed bar, an eccentric on which said lever is fulcrumed, means for oscillating the lever on said eccentric for moving the feed bar back and forth, means for oscillating the eccentric for raising and lowering the feed dog, and means whereby the oscillations imparted to said lever may be varied for varying the throw of the feed dog.

5. A feeding mechanism for sewing machines comprising a feed dog, a feed bar supporting the feed dog, a rocker to which said feed bar is pivoted, a substantially vertical lever pivoted to the feed bar, an eccentric on which said lever is fulcrumed, means for oscillating the lever on said eccentric for moving the feed bar back and forth, means for oscillating the eccentric for raising and lowering the feed dog, and means whereby the oscillations of the eccentric may be varied for varying the up and down movements of the feed dog.

6. A feeding mechanism for sewing machines comprising a feed dog, a feed bar supporting said feed dog, a feed rocker to which said feed bar is connected, a substantially vertical lever pivoted to said feed bar adjacent the free end thereof, an eccentric on which said lever is fulcrumed for oscillation, a shaft carrying said eccentric, means for oscillating said shaft, a second shaft, an adjustable crank carried by said shaft, a link connecting said crank to the lever for oscillating said lever, and means for oscillating said second shaft.

7. A sewing machine including in combination, a work support, an overhanging arm, a main shaft mounted in said overhanging arm, a feed bar located beneath the work support, a feed dog carried thereby, a feed rocker to which said feed bar is pivotally connected, a substantially vertical lever located beneath the work support and pivoted at its upper end to the feed bar adjacent the feed dog, an eccentric on which said lever is fulcrumed, a shaft carrying said eccentric, means operated by said main shaft for oscillating said shaft carrying the eccentric, a shaft located beneath said work support and carrying a crank on one end thereof, a link connecting said crank to said lever at the lower end thereof for oscillating the lever, and means actuated by the main shaft for oscillating said shaft carrying the crank.

In testimony whereof, I affix my signature.

FRIEDRICH LUTZ.